No. 843,610. PATENTED FEB. 12, 1907.
E. A. JOHNSTON.
HAY LOADER.
APPLICATION FILED OCT. 8, 1906.
3 SHEETS—SHEET 2.
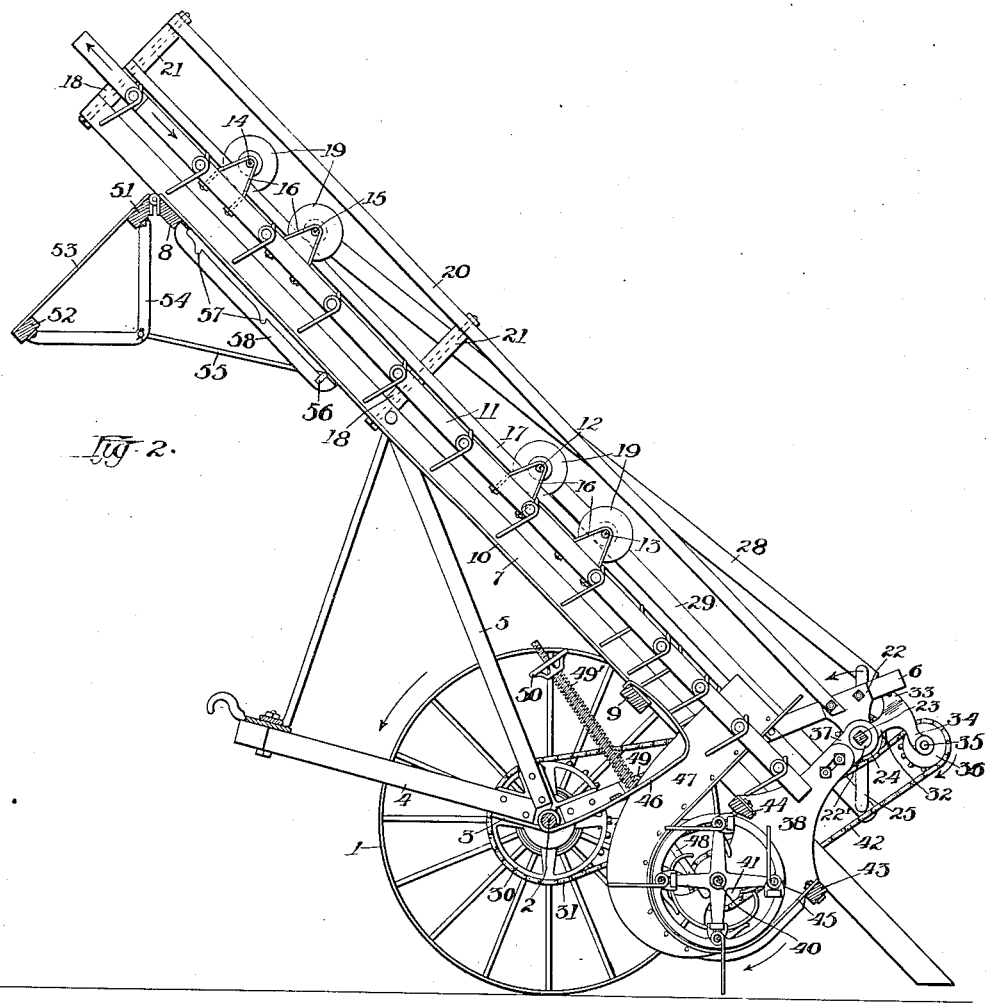

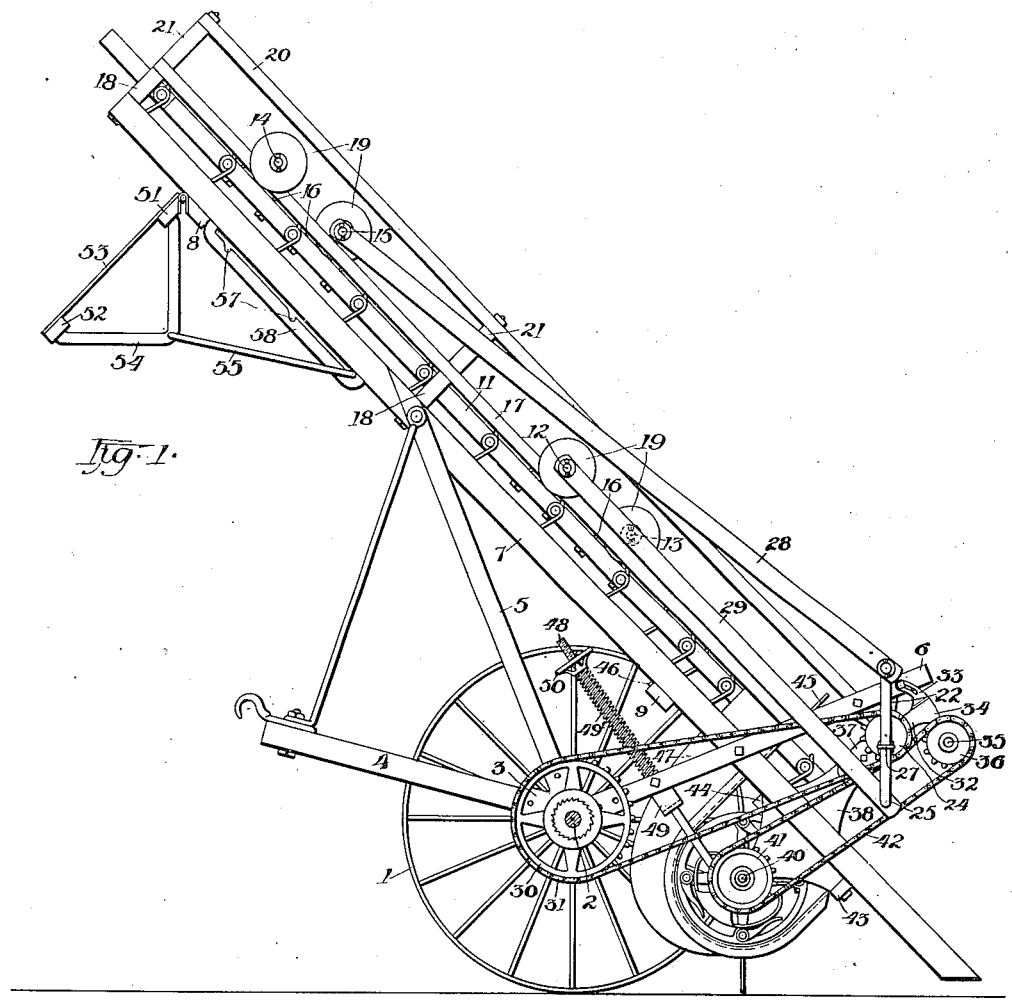

No. 843,610. PATENTED FEB. 12, 1907.
E. A. JOHNSTON.
HAY LOADER.
APPLICATION FILED OCT. 8, 1906.
3 SHEETS—SHEET 3.
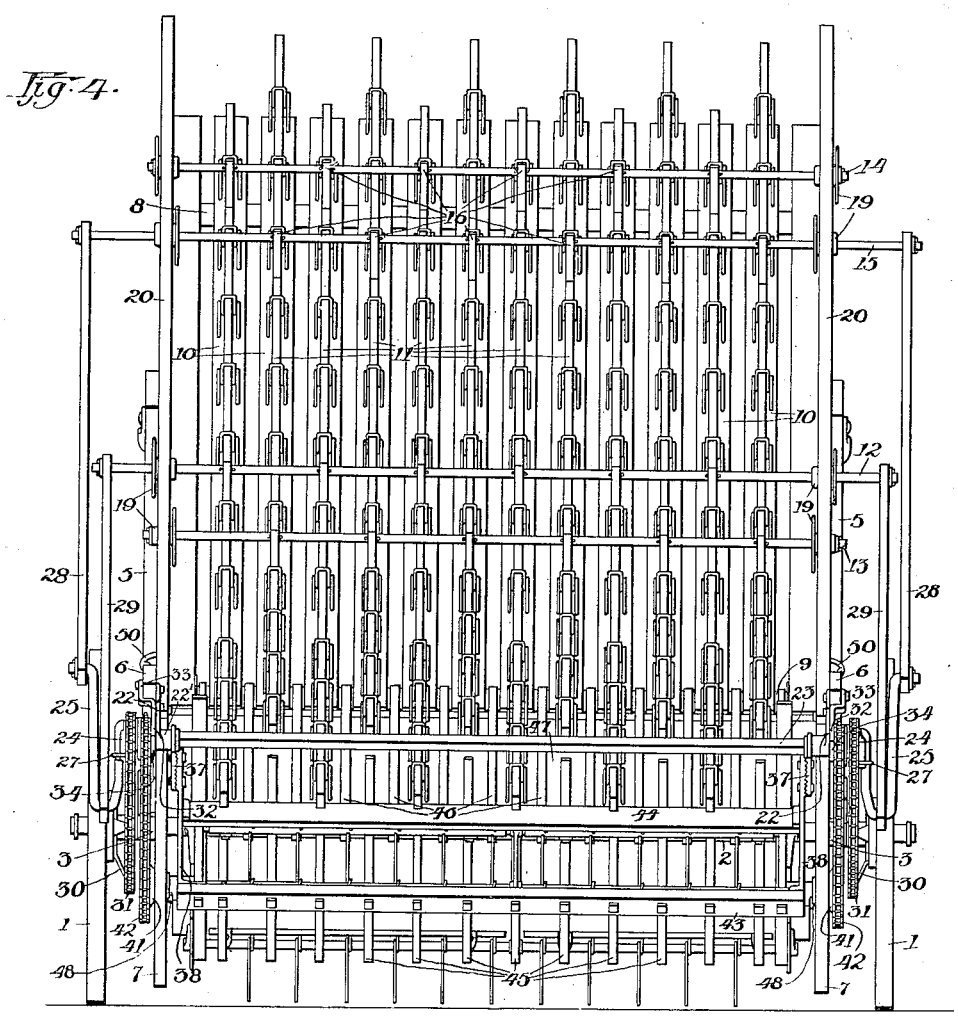
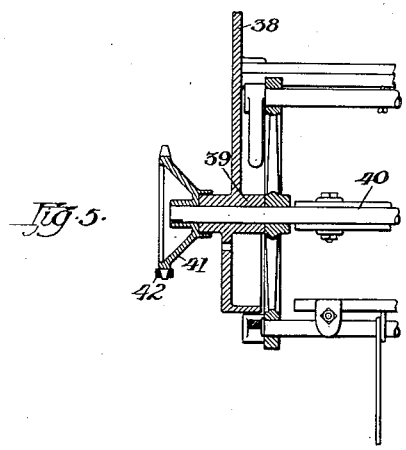
Witnesses:
Inventor
Edward A. Johnston
By his Attorney

UNITED STATES PATENT OFFICE.

EDWARD A. JOHNSTON, OF STERLING, ILLINOIS, ASSIGNOR TO INTERNATIONAL HARVESTER COMPANY, A CORPORATION OF NEW JERSEY.

HAY-LOADER.

No. 843,610.  Specification of Letters Patent.  Patented Feb. 12, 1907.

Application filed October 8, 1906. Serial No. 337,892.

*To all whom it may concern:*

Be it known that I, EDWARD A. JOHNSTON, a citizen of the United States, residing at Sterling, in the county of Whiteside and State of Illinois, have invented certain new and useful Improvements in Hay-Loaders, of which the following is a specification.

My invention relates to hay-loaders in which a toothed raking-cylinder operates in a manner to rake the hay from the ground and deliver it to elevating and conveying mechanism operative to deliver it upon the wagon.

The object of my invention is to provide a hay-loader that is simple, strong, and efficient and one that will readily adapt itself to inequalities of the surface over which it travels.

Referring to the accompanying drawings, Figure 1 is a side elevation of the machine with one of the carrying-wheels removed. Fig. 2 is an elevation from the same side as that shown in Fig. 1. Fig. 3 is a sectional detail showing the manner in which the crank connection between the reciprocating carriers and their driving-shaft is secured to the latter. Fig. 4 is a rear elevation of the machine, and Fig. 5 represents a sectional detail of part of the raking-cylinder and its supporting and driving means.

Similar reference-numerals designate like parts throughout the several views in the drawings.

1 represents the carrying-wheels, and 2 a rotatable axle upon which the wheels are mounted and connected therewith by means of the usual pawl-and-ratchet mechanism.

3 represents bearing-brackets journaled upon opposite ends of the axle and to which are secured draft-frame members 4, forwardly and upwardly inclined carrier-frame-supporting members 5, and rearwardly and upwardly inclined carrier-frame-supporting members 6.

The carrier-frame comprises the side members 7, having the transverse bars 8 and 9 secured to their lower sides near their upper and lower ends, respectively, and secured to the transverse bars are a series of slats 10, longitudinally disposed and having intervening spaces.

11 represents a number of reciprocating rakes suspended in two ranks from transversely-arranged bars 12 and 13 at their lower ends and 14 and 15 at their upper ends by means of U-shaped metal brackets 16, secured to the rake-bars and partially encircling the transverse bars, one rank being suspended from the bars 12 and 14 and the other from bars 13 and 15.

Above the side members 7, upon opposite sides of the carrier-frame, are arranged the side rails 17, having their lower ends secured to the rearwardly-inclined carrier-frame-supporting members 6, and arranged parallel with and extending upward are secured to the side members, with spacing-blocks 18 intervening. These side rails form a track for flanged wheels 19, that are loosely journaled upon the transversely-arranged bars 12 and 13 and 14 and 15. The bars and rakes connected thereto have a limited vertical freedom of movement in a manner to float upon the stream of hay passing upward on the carrier, the movement being limited by means of the upper side rails 20, having their lower ends also secured to the frame members 6, and extending upward are spaced apart from the rails 17 by means of spacing-blocks 21.

Secured near the upper ends of the carrier-frame-supporting members 6 are brackets 22, having laterally-projecting sleeve portions 22′, in which are journaled opposite ends of a transverse shaft 23, having double sprocket-wheels 24 secured thereto outside the journal-bearings for the shaft.

25 represents double cranks that are secured to the sprocket-wheels 24 by means of the laterally-turned ends 26, being received by openings in the sides of the wheels and secured thereto by means of a U-bolt 27, as shown in Fig. 3. The corresponding arms of each double crank are connected to the transverse bars 13 and 14 of the separate ranks of rakes by means of connecting-bars 28 and 29, as shown in Fig. 4.

Mounted upon the axle adjacent the carrying-wheels are driving sprocket-wheels 30, that may be clutched with or unclutched from the carrying-wheels by any of the well-known means, and 31 are sprocket-chains adapted to transmit motion from the driving sprocket-wheels to the double sprockets 24, secured to the transverse shaft 23.

Pivotally mounted upon the outer ends of the sleeves forming part of the brackets 22 are supplemental brackets 32, having one arm 33 adjustably connected with the frame member 6 by means of a bolt passing therethrough and through a slot in said arm, concentrically arranged relative to the shaft 23, as shown in Fig. 3, and another arm 34, having a stud 35 secured thereto, upon which is journaled a sprocket-wheel 36. Upon the inner ends of the sleeves referred to are pivotally mounted depending arms 37, and adjustably connected with the arms are depending members 38, having sleeves 39, in which are journaled opposite ends of a raking cylinder-shaft 40, and secured to the shaft, outside said sleeves, are sprocket-wheels 41, as shown in Fig. 5.

The member 38 is provided with slotted openings to receive the securing-bolts in a manner to permit the two members to be adjusted to vary the distance between the rake-driving shaft and the cylinder-driving shaft, and their contacting surfaces are corrugated as an additional means for preventing accidental slipping of one part relative to the other.

Motion is transmitted from the rake-driving shaft to the raking-cylinder by means of the sprocket-wheels 24 engaging with sprocket-chains 42, connecting sprocket-wheels 41 and 36, the latter being adjustable about the axis of the rake-driving shaft by means of the swinging bracket 32 in a manner to tighten the chain 42 when found necessary.

The members 38 are joined together by means of the transverse bars 43 and 44, and 45 represents curved straps having their rear ends secured to the transverse bar 43 and their body portion partially surrounding the raking-cylinder, operative as strippers to clear the teeth of the cylinder as they deliver the hay to the reciprocating rakes, the forward ends of the clearers projecting above the path of the rakes, as shown in Fig. 2.

46 represents a series of guards having their lower ends encircling the axle and their upper ends turned forward and resting upon the transverse frame member of the carrier-frame, as shown in Fig. 2, which guards, in combination with the strippers 45, form a receiving and elevating throat 47, along which the hay is delivered to the reciprocating rakes. The raking-cylinder being mounted in the frame comprising the depending members 37 and 38 and the transverse bars 43 and 44 is free to swing about the axis of the rake-driving shaft, and its position is controlled by means of links 48, having their lower ends pivotally connected with the members 38, and passing forward and upward are slidably received by sleeves 49, that are pivotally connected with the frame-supporting members 6, and 49' are springs encircling the links above the sleeves, and 50 represents hand-wheels that are threaded upon the upper ends of the links and are operative to adjust the tension of the springs in the well-known way. The springs cause the raking-cylinder to float upon the surface of the ground and yieldingly draw its axle toward the main axle.

It is advantageous to have the raking-cylinder supported in the manner described, as it more readily accommodates itself to the varying conditions of crop. If the swath is light, it does not press heavily upon the ground; but as the resistance to the teeth is increased the cylinder moves rearward and downward in a manner to cause its teeth to become more aggressive in their action.

The elevator at its delivery end is provided with an adjustable portion comprising a movable extension of the slatted bottom of the carrier-frame, having two transverse bars 51 and 52, to which are secured slats 53. The bar 51 is connected, by means of hinges, with the upper transverse bar 8 of the carrier-frame, and 54 represents brackets secured to the cross-bars 51 and 52, and 55 are links having one end pivotally connected with the brackets and their opposite ends provided with hook portions 56, adapted to engage with notches 57, formed in locking-bars 58, secured to the side members of the carrier-frame in a manner to secure the carrier extension in any desired position of adjustment.

What I claim as my invention, and desire to secure by Letters Patent, is—

1. A hay-loader comprising, in combination, an axle supported by carrying-wheels, a carrier-frame mounted upon said axle and inclined forward and upward, a raking-cylinder pivotally suspended from the carrier-frame, the axis of its pivotal connection being in rear of and above said axle, said raking-cylinder being adjustable toward or from said axle.

2. A hay-loader comprising, in combination, an axle supported by carrying-wheels, a carrier-frame mounted upon said axle and inclined forward and upward, a raking-cylinder pivotally suspended from the carrier-frame, the axis of its pivotal connection being in rear of and above said axle, said raking-cylinder being yieldingly held against movement in a direction away from said axle.

3. A hay-loader comprising, in combination, an axle supported by carrying-wheels, a carrier-frame mounted upon said axle and inclined forward and upward, a raking-cylinder pivotally suspended from the carrier-frame, the axis of its pivotal connection being in rear of and above said axle, means for adjusting the axis of said cylinder toward or from the axis of suspension, said raking-cylinder being adjustable toward or from said axle.

4. A hay-loader comprising, in combination, an axle supported by carrying-wheels, a carrier-frame mounted upon said axle and inclined forward and upward, a series of rakes mounted in said frame in a manner to be reciprocated longitudinally relative thereto, a transverse shaft journaled in said frame in rear of and above said axle, double cranks secured to opposite ends of said shaft, said cranks being operatively connected with said rakes, a raking-cylinder suspended from the axis of said transverse shaft and adapted to be adjusted toward or from said axle.

5. A hay-loader comprising, in combination, an axle supported by carrying-wheels, a carrier-frame mounted upon said axle and inclined forward and upward, a series of rakes mounted in said frame in a manner to be reciprocated longitudinally relative thereto, a transverse shaft journaled in said frame in rear of and above said axle, double cranks secured to opposite ends of said transverse shaft, said cranks being operatively connected with said rakes, a raking-cylinder suspended from the axis of said transverse shaft in a manner to be adjusted toward or from said axis, said cylinder being adapted to swing about said axis in a direction toward or from said axle.

6. A hay-loader comprising, in combination, an axle supported by carrying-wheels, a carrier-frame mounted upon said axle and inclined forward and upward, a series of rakes mounted in said frame in a manner to be reciprocated longitudinally relative thereto, a transverse shaft journaled in brackets secured to said frame in rear of and above said axle, double cranks secured to opposite ends of said shaft, said cranks being operatively connected with said rakes, depending members pivotally mounted upon said brackets and adapted to swing about the axis of the shaft journaled therein, a raking-cylinder having journal-bearings at opposite ends thereof, said journals being mounted in sleeves forming part of the lower ends of cylinder-supporting members, said members having their upper ends adjustably secured to said depending members in a manner permitting said raking-cylinder to be adjusted toward or from the axis of said transverse shaft.

7. A hay-loader comprising, in combination, an axle supported by carrying-wheels, a carrier-frame mounted upon said axle and inclined forward and upward, said frame comprising rearwardly and upwardly inclined frame-supporting members, brackets secured to the upper ends of said frame-supporting members, said brackets provided with laterally-projecting sleeve portions, a transverse shaft journaled in said sleeve portions, means for conveying the hay along said carrier-frame comprising said shaft, depending members pivotally mounted upon said sleeve portions, a raking-cylinder, a supporting-frame for said cylinder, said frame comprising end members having sleeve portions at their lower ends forming bearings for the journals of said cylinder, transverse bars connecting said end members, the upper ends of said end members being adjustably secured to said depending members in a manner permitting said cylinder-supporting frame to be adjusted toward or from the axis of said transverse shaft.

8. A hay-loader comprising, in combination, an axle supported by carrying-wheels, a carrier-frame mounted upon said axle and inclined forward and upward, said frame comprising rearwardly and upwardly inclined frame-supporting members, brackets secured to the upper ends of said frame-supporting members, said brackets provided with laterally-projecting sleeve portions, a transverse shaft journaled in said sleeve portions, means for conveying the hay along said carrier-frame comprising said shaft, depending members pivotally mounted upon said sleeve portions, a raking-cylinder, a supporting-frame for said cylinder, said frame having end members secured to said depending members, sprocket-wheels mounted upon said axle and operatively connected with said carrying-wheels, sprocket-wheels secured to opposite ends of said transverse shaft, brackets pivotally mounted upon the sleeve portion of the brackets in which said transverse shaft is journaled and adjustably connected with said rearwardly-inclined frame-supporting members, sprocket-wheels rotatably mounted upon said pivoted brackets and above the axis of said transverse shaft, sprocket-wheels secured to the ends of said raking-cylinder, sprocket-chains connecting the cylinder with said sprockets carried by said pivoted brackets, and sprocket-chains connecting the sprocket-wheels secured to said transverse shaft with those mounted upon said axle.

9. A hay-loader comprising, in combination, an axle supported by carrying-wheels, a carrier-frame mounted upon said axle and inclined forward and upward, a series of reciprocatory rakes operatively mounted upon said carrier-frame, a raking-cylinder rotatably mounted at the lower end of said carrier-frame below said rakes, said cylinder being journaled in a frame, said frame comprising end members and transverse bars connecting said end members, one of said bars being in rear of the axis of said cylinder, and a series of curved stripper-bars partially encircling said raking-cylinder and having their rear ends secured to said rear transverse bar, and their forward free ends projecting above said cylinder and said reciprocatory rakes.

10. A hay-loader comprising, in combination, an axle supported by carrying-wheels, a carrier-frame mounted upon said axle and inclined forward and upward, a series of reciprocatory rakes operatively mounted upon said carrier-frame, a raking-cylinder rotatably mounted at the lower end of said carrier-frame below said rakes, said cylinder being journaled in a frame, said frame comprising end members and transverse bars connecting said end members, one of said bars being in the rear of the axis of said cylinder, a series of curved stripper-bars partially encircling said raking-cylinder and having their rear ends secured to said rear transverse bar and their forward free ends projecting above said cylinder and said reciprocatory rakes, and a series of guard-bars having their lower ends loosely encircling the axle and extending rearward and upward and then forward and having their free ends resting upon a transverse member of the carrier-frame below the reciprocatory rakes, with an intervening feeding-throat between said series of guard-bars and said stripper-bars.

11. A hay-loader comprising, in combination, an axle supported by carrying-wheels, a carrier-frame mounted upon said axle and inclined forward and upward, a series of reciprocatory rakes operatively mounted upon said carrier-frame, said carrier-frame comprising rearwardly and upwardly inclined frame-supporting members, brackets secured to the upper ends of said frame-supporting members, a transverse shaft journaled in said brackets, double cranks secured to opposite ends of said shaft, said cranks being operatively connected with said rakes, a raking-cylinder, a frame in which said cylinder is mounted, said frame being suspended from said brackets in a manner to swing about the axis of said transverse shaft, with said cylinder in rear of and below the axle of said machine, a series of guard-straps extending rearward and upward from said axle and then forward and having their free ends resting upon a transverse member of said frame, a transverse bar comprising part of said raking-cylinder frame and located in rear of said cylinder, stripper-bars having one end secured to said transverse bar and then extending downward and partially encircling said cylinder and having their free ends extended above said cylinder and said reciprocatory rakes, with an intervening feeding-throat between said strippers and said guard-bars, said cylinder being yieldingly held toward said guard-bars in a manner to cause the feeding-throat to be variable in its capacity.

EDWARD A. JOHNSTON.

Witnesses:
R. L. BUTLER,
E. R. THOMPSON.